March 10, 1931.    H. K. GREEN    1,795,773
ARTIFICIAL BAIT
Filed June 28, 1930
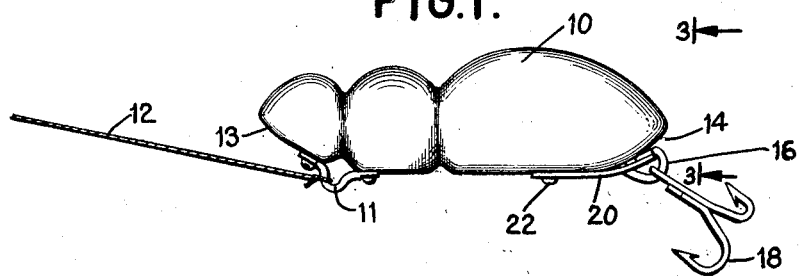
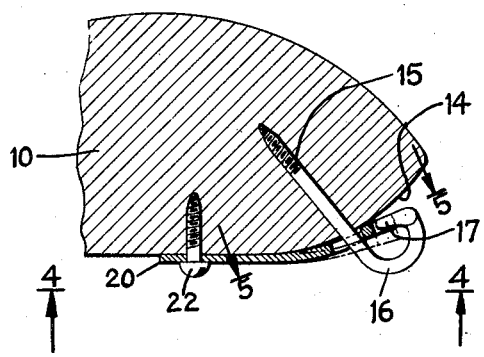
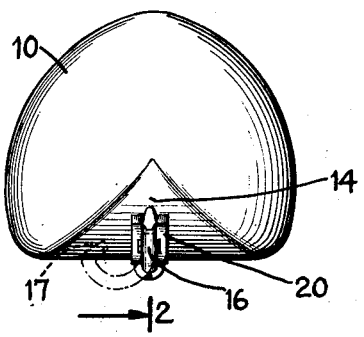
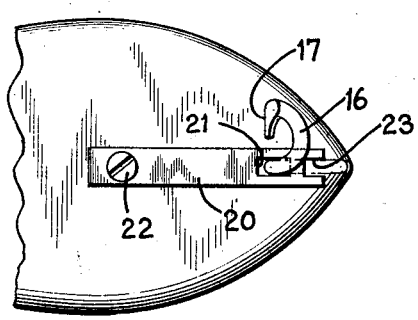
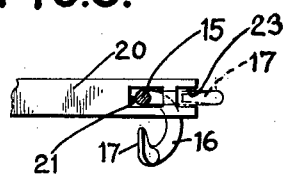
Howard K. Green
Inventor
By his Attorneys
Cooper, Kerr & Dunham Patented Mar. 10, 1931

1,795,773

UNITED STATES PATENT OFFICE

HOWARD K. GREEN, OF BROOKLYN, NEW YORK, ASSIGNOR TO GREEN-WYLE COMPANY, OF BROOKLYN, NEW YORK, A PARTNERSHIP COMPOSED OF HOWARD K. GREEN AND JOHN H. WYLE

ARTIFICIAL BAIT

Application filed June 28, 1930. Serial No. 464,534.

This invention relates generally to artificial fish bait, and has for one of its objects the provision of a bait which is reliable and highly efficient in catching fish.

Another object is to provide a construction by which hooks may readily be attached to a body portion of the bait, and which is so organized that strain from a hooked fish is so placed that the hooks cannot become detached from the bait.

Another object is to provide a hook retainer on the bait which can be positively latched in hook-retaining position, but which is so constructed that no dangerous strain is ever thrown on the latching devices.

With the foregoing and other objects in view, the invention comprises a novel construction and combination of parts, the novel features of which are pointed out in appended claims, and one embodiment of which is hereinafter described with references to the drawing accompanying and forming a part of this specification.

In said drawings:

Fig. 1 is a side view of an artificial bait containing various features of the invention.

Fig. 2 is a partial cross section along the line 2—2 of Fig. 3.

Fig. 3 is a rear view on the line 3—3 of Fig. 1 with the hook-retaining hook shown in full lines in its normal position and, in dotted lines, its open or hook-receiving position.

Fig. 4 is a view along the line 4—4 of Fig. 2.

Fig. 5 is a detail view on the line 5—5 of Fig. 2 of the hook-retaining hook and the latch therefor.

The device shown in the drawings comprises a body portion 10 constructed of wood or other material lighter than water and suitably colored to attract fish. The shape of the body may be varied according to the kind of fish which it is desired to attract, or according to the kind of live bait which it is desired to represent.

Attached to the body of the bait is some means, in this instance the loop 11, to which the line or snell 12 may be secured.

The underside of the device shown in the drawing has an inclined flat portion 13 which tends to keep the bait on top of the water, and other parts of the underside of the body are also formed to provide flat surfaces contributing to that result.

The rear end of the body is curved upward, as at 14. Screwed into this surface is the shank 15 of a hook which has its bow 16 normally extending rearward of the bait with an in-turned end portion 17 which, at its tip, is close to or in contact with the surface of the body portion 10. The hook is so constructed that when in the normal position in Figs. 1 and 2 any article, such as the hooks 18, cannot be detached until the retaining hook 16 is turned far enough to carry the end or tip 17 away from the surface of the bait body far enough to provide a clearance.

The construction of the retaining hook 15, 16, 17 is such that when in normal position the hooks 18, or corresponding devices, cannot easily be accidentally detached, and any strain from a hooked fish will be at such an angle with respect to the shank 15 and bow 16 that there will be little or no tendency to rotate the retaining hook relative to the body of the bait. This construction is fairly satisfactory, so far as safety is concerned, as the retaining hook must be rotated to a point approaching a right angle to the axis of the body 10 before there is sufficient clearance between the tip 17 of the retaining hook and the body 10 to permit the hooks 18 to be disengaged.

However, it is preferred to latch the retaining hook in a normal position in such a way that it can only be rotated by purposely disengaging the latch. In the illustrative embodiment shown in the drawings, this latch is in the form of a flat spring 20 having an aperture 21 surrounding the shank of the retaining hook and secured, as at 22, to the body of the bait. The spring may be curved to conform to the shape of the adjacent portion of the bait body and, in the present instance, has a notch or open ended slot 23 which engages the tip or in-turned portion 17 of the retaining hook when that hook is in its normal position. This construction is highly efficient for latching the hook, but is nevertheless simple and of such appearance as not to detract from the lifelike appearance of the bait, or make the device as a whole clumsy and cumbersome.

It is obvious that the location of the retaining hook 16 with respect to the body of the bait may be varied, and that a similar construction may be used for attaching the line or snell to the bait. It is also obvious that the construction of the spring latch may be varied so long as the purpose of preventing rotation of the retaining hook is effected.

When it is desired to attach or detach the hooks 18, or similar devices, the free end of the spring 20 is lifted far enough to disengage its notch 23 from the tip 17 of the retaining hook, this lifted position being shown by the dotted outline A in Fig. 2. The retaining hook is then rotated to carry the bow 16 and tip 17 to the positions shown in Figs. 4 and 5, and fish hooks or the like may then be engaged with the retaining hook. The retaining hook is then returned to the normal position, Figs. 1 and 2, and the spring latch engaged with the tip 17 to hold the retaining hook in that position.

A number of bait bodies equipped as herein described may be carried loosely in the pocket and any one of them quickly fitted with hooks ready for use; or, different hooks may readily be attached to the same bait body as desired.

Some of the modifications of the form illustrated in the drawing have been definitely mentioned in the foregoing, and other changes and variations will be apparent to those skilled in the art. However, it is not the desire to be limited to the details of any particular embodiment except as stated in the following claims.

What is claimed is:

1. In an article of the character described, the combination of a body portion, a retaining hook rotatable relative to said body portion and normally having its point adjacent the surface of the body, and a releasable latch normally engaging the point portion of the retaining hook to prevent rotation of the hook.

2. In an article of the class described, the combination of a body portion, a retaining hook rotatable relative to said body portion and normally having its point adjacent the surface of the body, and a spring latch normally engaging the point portion of the retaining hook to prevent rotation of the hook, said latch being releasable to free the hook for rotation.

3. In an article of the character described, the combination of a body portion, means whereby a fishing line may be secured to the body portion, a hook-retaining hook rotatable in the body portion with the point of the retaining hook normally adjacent the surface of the body, and a latch, secured to the body portion, normally preventing rotation of the retaining hook and operable to release said retaining hook for rotation.

4. In an article of the character described, the combination of a body portion, a retaining hook rotatable relative to said body portion normally having its bow extending rearward of the body portion and its outer end substantially parallel to the surface of said body portion, and a spring attached to the body portion having a notch normally engaging the outer end of the hook to prevent rotation of the hook, said spring being manually operable to disengage the notch therein from the hook to free said hook for rotation.

5. In an article of the kind described, the combination of a body portion, a retaining hook rotatably mounted on said body portion with its bow extending rearwardly of the body portion and its free end turned inward of the bow to provide a portion close to the surface of the body, and a spring latch constructed to engage the in-turned portion to prevent rotation of the hook, said spring latch being operable to free the hook for rotation.

6. In an article of the character described, the combination of a body portion, a hook having its shank rotatable in said body portion and constructed to provide a portion adjacent its free end substantially parallel to and in contact with the surface of the body portion, and a spring latch attached to the body portion constructed to span the free end of the hook to hold the hook in a normal position, said latch being manually operable to release the hook for rotation.

7. In an article of the character described, the combination of a body portion, a hook having its shank rotatable in said body portion and constructed to provide a portion adjacent its free end substantially parallel to and in contact with the surface of the body portion, and a spring surrounding the shank of the hook and having a portion constructed to engage the free end portion of the hook to prevent rotation of the hook, said spring being secured at one end to the body portion and manually operable to release the hook for rotation.

In testimony whereof I hereto affix my signature.

HOWARD K. GREEN.